May 17, 1932. A. L. EMENS 1,858,703
ELECTRICITY METER
Original Filed Jan. 11, 1929
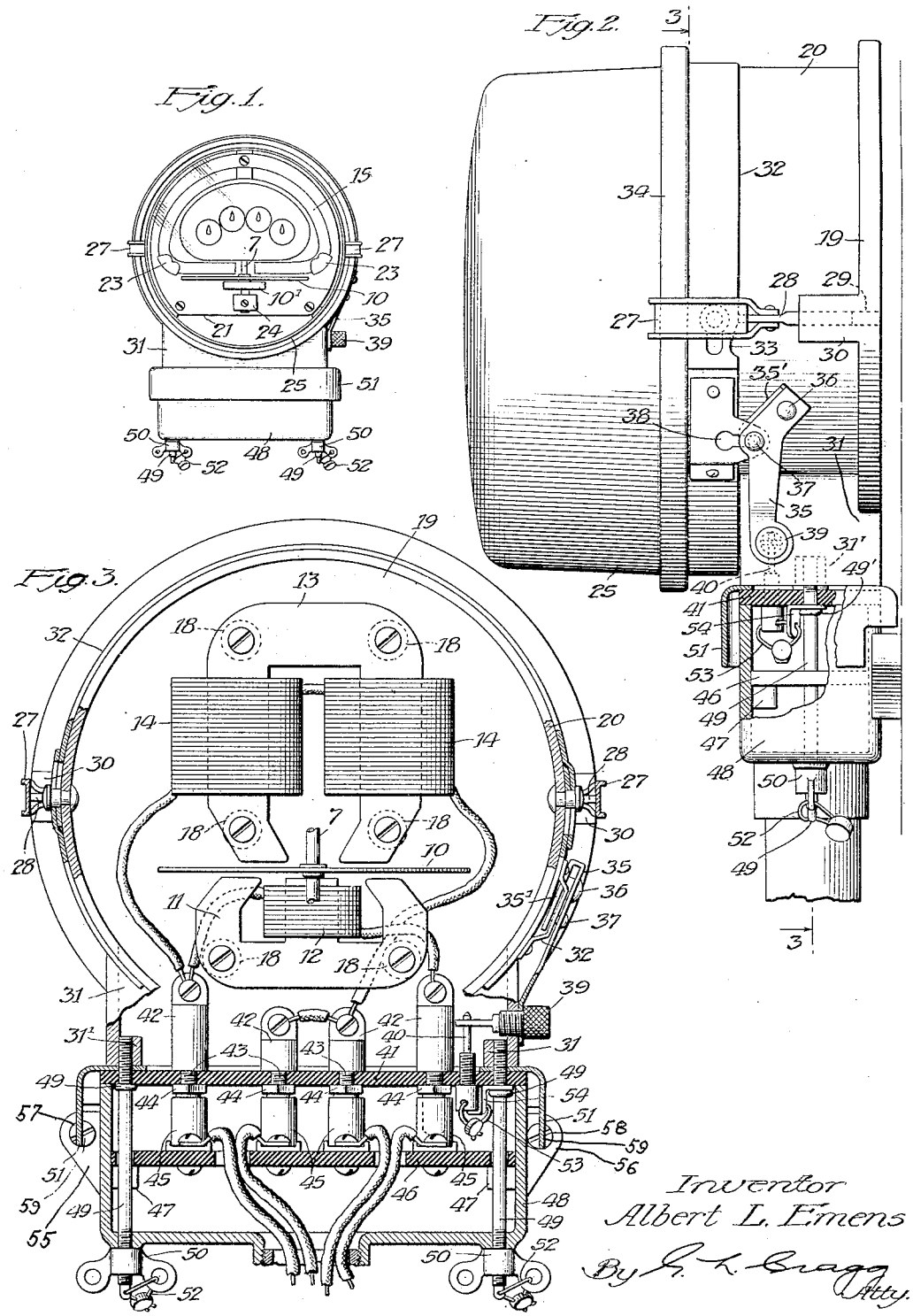
Inventor
Albert L. Emens
By G. L. Cragg
Atty.

Patented May 17, 1932

1,858,703

UNITED STATES PATENT OFFICE

ALBERT L. EMENS, OF LA FAYETTE, INDIANA, ASSIGNOR TO DUNCAN ELECTRIC MANUFACTURING COMPANY, OF LA FAYETTE, INDIANA, A CORPORATION OF ILLINOIS

ELECTRICITY METER

Original application filed January 11, 1929, Serial No. 331,731, Patent No. 1,762,218, dated June 10, 1930. Divided and this application filed August 5, 1929. Serial No. 383,671.

My invention relates to electricity meters and has as its object the provision of means for guarding the service connection box, when separately formed, from access of moisture thereto where it is applied to the body portion of the casing. My present application is a division of my original application, Ser. No. 331,731, filed January 11, 1929.

In carrying out my invention I employ a skirted cap or hood whose skirt surrounds the upper portion of the service connection box to prevent the access of moisture between the adjacent surfaces of this box and the body of the meter casing. The end wall of the cap is preferably clamped between the service connection box and the body of the meter casing.

The invention will be more fully explained in connection with the accompanying drawings in which Fig. 1 is a front view on a small scale illustrating an electricity meter equipped in accordance with my invention; Fig. 2 is a side view of the meter shown in Fig. 1 with parts in section; and Fig. 3 is a sectional view on line 3—3 of Fig. 2.

The meter illustrated is an induction watt-hour meter. This meter is inclusive of an upright spindle or shaft 7 suitably held in bearings at its ends. A horizontal aluminum armature disc 10 is carried by the spindle on which the disc is rigidly secured. This disc is turned proportionately to the energy consumed by the load by a magnet system that is inclusive of a current or series magnet and a pressure or shunt magnet. The current magnet is inclusive of an E shaped core of laminated iron 11 whose middle leg is wound by a coil 12 serially included in one load circuit side. The pressure magnet is inclusive of U shaped laminated iron core 13 whose legs are surrounded by the coils 14 which are connected in series in the same bridge between the load circuit sides. The speed of the armature of the meter is checked by the damping permanent magnet 15 which is upon one side of the disc 10, a keeper 10' being upon the other side of the disc. The meter parts illustrated and described constitute a meter motor whose armature 10 and spindle 7 turn proportionately to the wattage in a manner well known to those familiar with the art.

The cores of the current and pressure magnets are carried by posts 18 which, in turn, are carried by the upright back wall 19 of the meter casing. The arcuate wall 20 of the meter casing body projects forwardly from the meter back 19 and surrounds the magnets. This casing body is desirably formed of cast iron. An upright plate 21, of iron, constitutes a magnetic shield which is interposed between the magnet system and the damping magnet. Said plate is nearly coplanar with the front edge of the meter casing. A clip structure, of which a portion 23 is shown, is carried by and upon the front face of the plate 21 and carries the damping magnet 15 in front of said plate. A post 24 is carried by and projects forwardly from the plate 21 and carries the keeper 10'. A cover 25, preferably of glass, is of cup shape, the rim of the cup being carried upon the front edge of the meter casing body. The means illustrated for clamping the cover in place is inclusive of two diametrically opposite latching hooks 27. Each of these hooks is swingingly mounted upon the head of a bolt 28. The stems of these bolts are slidingly received in bores 29 that extend along the axis of the meter and are provided in ears 30 that are cast integrally with the body portion of the meter casing. The heads of said bolts are forwardly projected beyond the places of attachment of the latching hooks with the bolts. The body of the casing is desirably completely circular at the extreme front end thereof that projects forwardly beyond the rectangular continuation 31 of the casing body. This circular portion of the meter casing body is surrounded by a ring 32 that may turn upon this circular portion of the casing. The ring carries two cam portions 33, each bolt having one of these cam portions individual thereto. When the ring is turned in one direction the cam portions engage the bolt heads and force the rearward movement of the bolts and a consequent rearward movement of the hooks 27 to cause the cover engaging ends of these hooks to grip the annular rib 34 of the cover 25, Fig. 2, whereby the cover is firmly clamped against the packing 26 and said packing is firmly clamped against the front rim of the meter casing body. Means for placing the ring 32 in its alternative positions is inclusive of a lever 35 which is pivoted, at one end 36, upon the meter casing body and which carries an actuating pin or projection 37 at an intermediate portion thereof. This pin or projection desirably has one end carried directly upon an intermediate portion of the lever 35 and its other end directly carried upon a returned portion 35' of said lever. The shank of the pin passes through the keyhole slot 38 which is formed through the outwardly bulged enlargement 32' of the ring 32. When the lever 35 is turned clockwise the ring 32 is turned counterclockwise to free the bolts 28 from the influence of the cams 33, the latch hooks 27 being then releasable from engagement with the cover rib 34. When the lever 35 is turned in a counterclockwise direction the ring 32 is turned in a clockwise direction to force the cams 33 into engagement with the bolts 28, said bolts being thereby forced rearwardly together with the latch hooks 27 that are then forced into holding engagement with the cover rib 34. The lever 35 is maintained in its latch applying position by means of a pin 39 whose shank is screwed into and through one wall of the casing continuation 31 and whose head is clamped against the outer end of said lever through which the pin shank also passes. Withdrawal of the clamping pin 39 is prevented by the inner end of the holding pin 40 which is screwed into and through the terminal block 41 that constitutes the closure for the opening in the bottom of the casing continuation 31. The pin 40 is desirably passed through an opening 39' in the inner end of the shank of the screw 39, turning of this screw being thus effectively prevented. As will later appear sealing means are provided to guard against the undetectable withdrawal of the pin 40 from holding engagement with the pin 39.

The terminal block 41 formed of insulation carries the four meter terminals 42 that are contained in the meter casing. Contact pins 43 are screwed into the terminals 42. These contact pins have polygonal flanges 44. The terminal block 41 is clamped between the terminals 42 and the flanges 44 and said terminals are, consequently, mounted upon the upper side of said terminal blocks. The pins 43 are received within the contact sleeves 45 with which the line and load circuit sides are connected as is well understood by those familiar with the art. The contact sleeves 45 are mounted upon a terminal block 46, also formed of insulation. The terminal block 46 is mounted upon the ears 47 that are cast integrally with and within the service connection box 48. The terminal block 41 is clamped against the rim that surrounds the open upper end of the service connection box by means of the clamping bolts 49 that are screwed into the ears 31 that are cast integrally upon and within the casing continuation 31. Said clamping bolts are formed with shoulders 49' which have direct clamping engagement with the block 41. Said bolts are also provided with wing nuts 50 which are screwed upon their outer ends and force the service connection box 48 against the terminal block 41. A skirted cap 51 has its end wall clamped between the terminal block 41 and the bottom edge of the meter casing continuation 31. This cap end wall is formed with a large opening to permit of the clear passage of the meter terminals 42 from the terminal block 41 into the interior of the metering casing. The skirt of said cap surrounds the terminal block 41 and the top rim of the service connection box and desirably extends a considerable distance below said terminal block, whereby access of moisture to the service connection box at the upper end of this box is guarded against.

Undetectable access to the interior of the service connection box is prevented by means of the sealed wires 52 which are passed through openings that are formed in the wing nuts 50 and the outer ends of the bolts 49. So long as said sealing wires are unbroken the interengagement of the pins 39 and 40 remains intact. If the service connection box is removed the undetectable removal of the pin 40 is still guarded against by the sealing wire 53 which is passed through the head of the pin 40, that is below the terminal block 41, and through a clip 54 that is clamped between the terminal block 41 and the shoulder 49' of the adjacent clamping bolt 49. The sealing wires 52 and 53, in cooperation with the pin 40, thus effectively guard the pin 39 from undetectable removal from its effective position in which it holds the lever 35 in a position in which this lever functions, indirectly, to hold the meter cover in place.

It will be further noted that the service connection box includes lateral securing ears 55 and 56 having openings 57 and 58 therein respectively through each of which a fastening element 59 is passed to effect mounting of the meter upon a support. It will now be observed that the skirt 51 overlies the openings 57 and 58 and the securing elements 59 to provide means to prevent access to said elements for the purpose of surreptitiously removing them and shifting the meter to a position which might interfere with its accurate operation.

Changes may be made without departing from the invention.

Having thus described my invention, I claim:

1. The combination with a casing for an electricity meter; of a service connection box applied to the meter casing; a terminal block confined between the service connection box and the meter casing and carrying the meter terminals; and a skirted cap having an end wall confined between said terminal block and the meter casing and having its skirt overlying the joint between the terminal block and the adjacent end of the service connection box to guard against the access of moisture, at said terminal block, to the interior of the service connection box.

2. The combination with a casing for an electricity meter; of a service connection box applied to the meter casing, said box having laterally directed securing ears provided respectively with perforations for securing elements, a terminal block confined between the service connection box and the meter casing and carrying the meter terminals, and a skirted cap having an end wall confined between said terminal block and the meter casing and having its skirt overlying the perforations in said securing ears when the meter casing and service connection box are assembled and mounted on a support, whereby said skirt will prevent access to fastening devices extending through said perforations.

In witness whereof, I hereunto subscribe my name.

ALBERT L. EMENS.